Feb. 16, 1960    M. D. BUIVID    2,925,130
MEANS OF FOLDING ROTOR BLADES
Filed Oct. 1, 1954    4 Sheets-Sheet 1
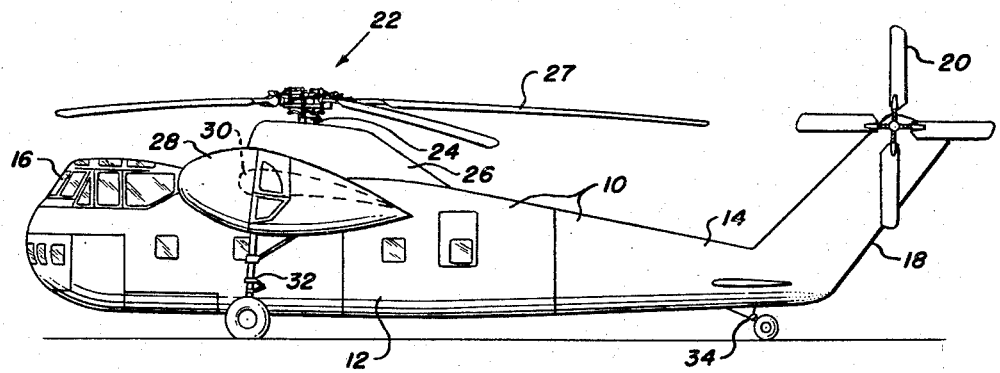
Fig. 1
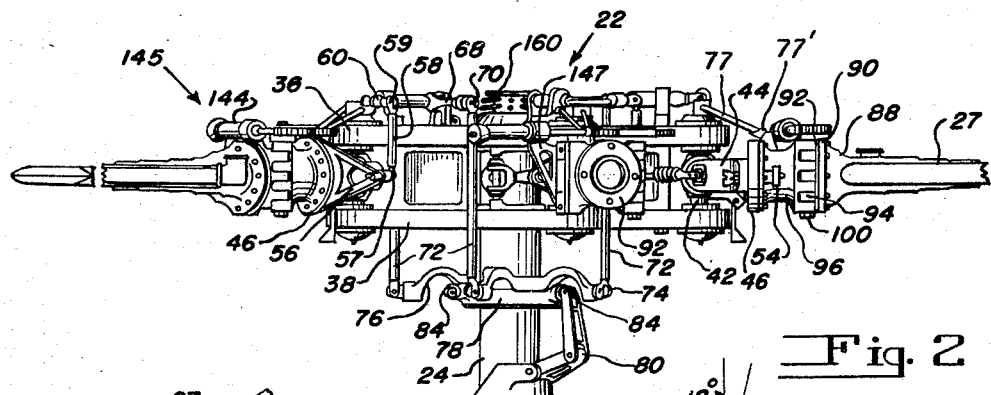
Fig. 2
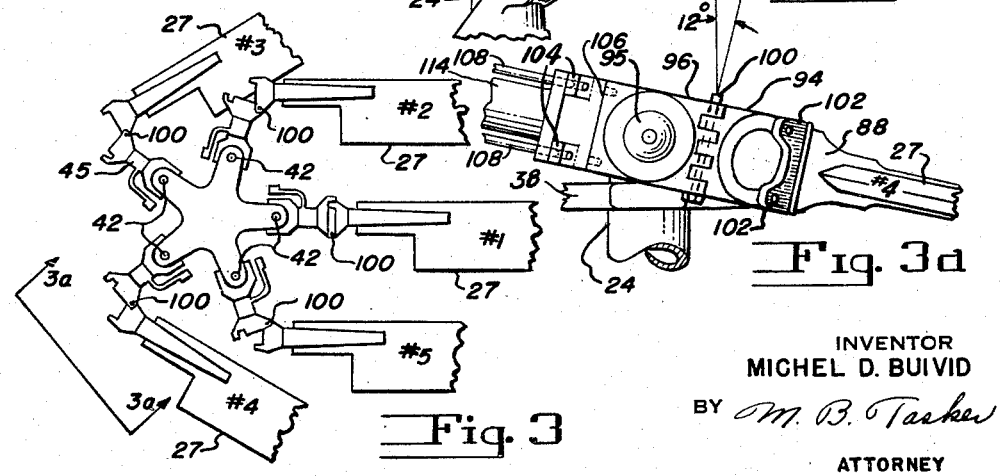
Fig. 3a
Fig. 3
INVENTOR
MICHEL D. BUIVID
BY
ATTORNEY

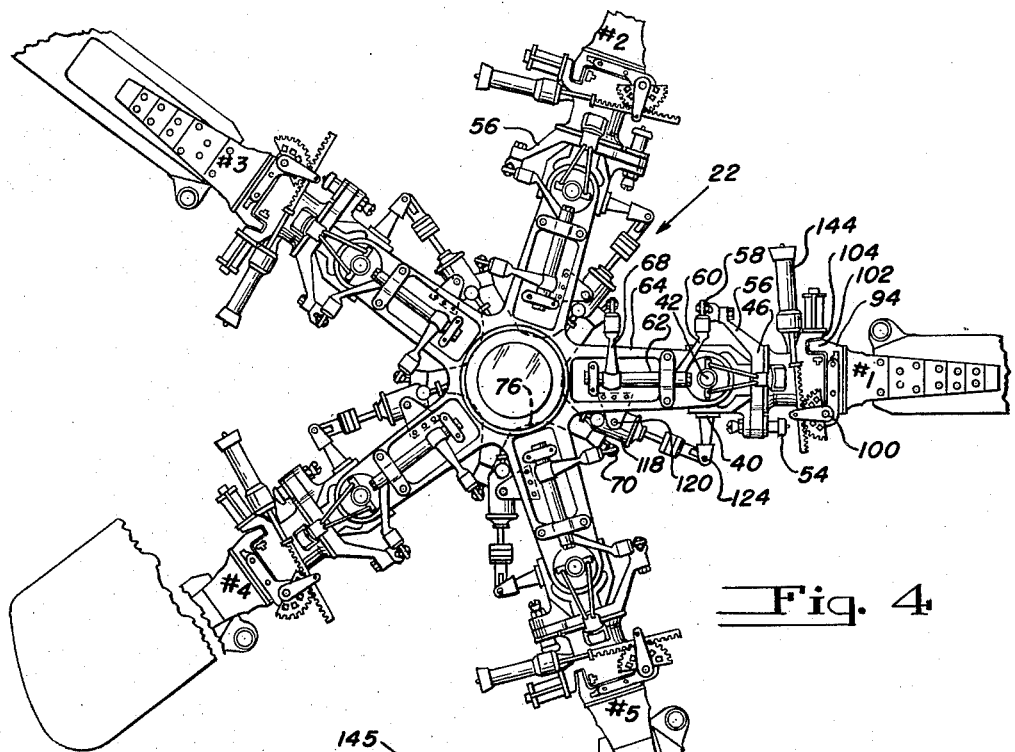
Fig. 4
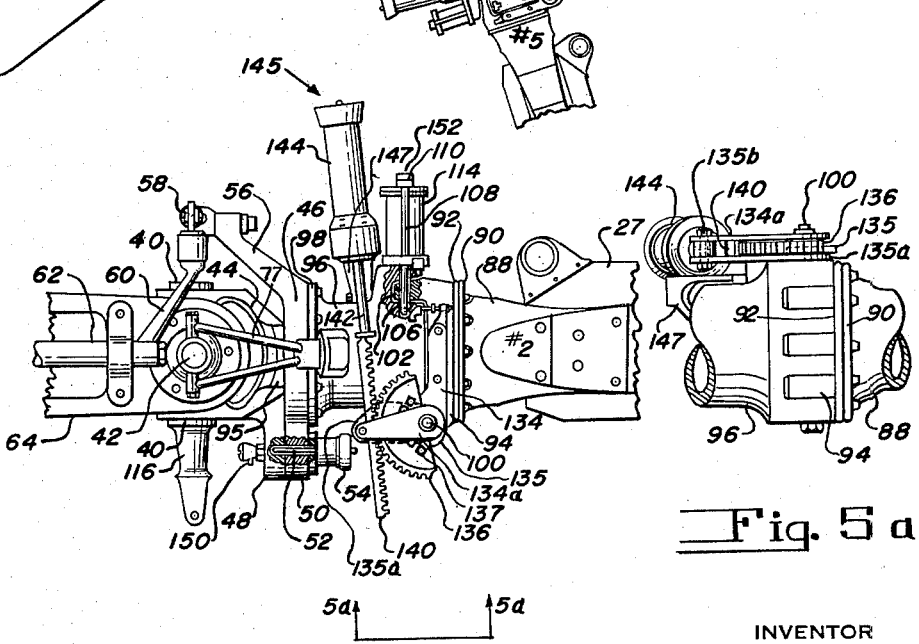
Fig. 5
Fig. 5a
INVENTOR
MICHEL D. BUIVID
BY M. B. Tasker
ATTORNEY

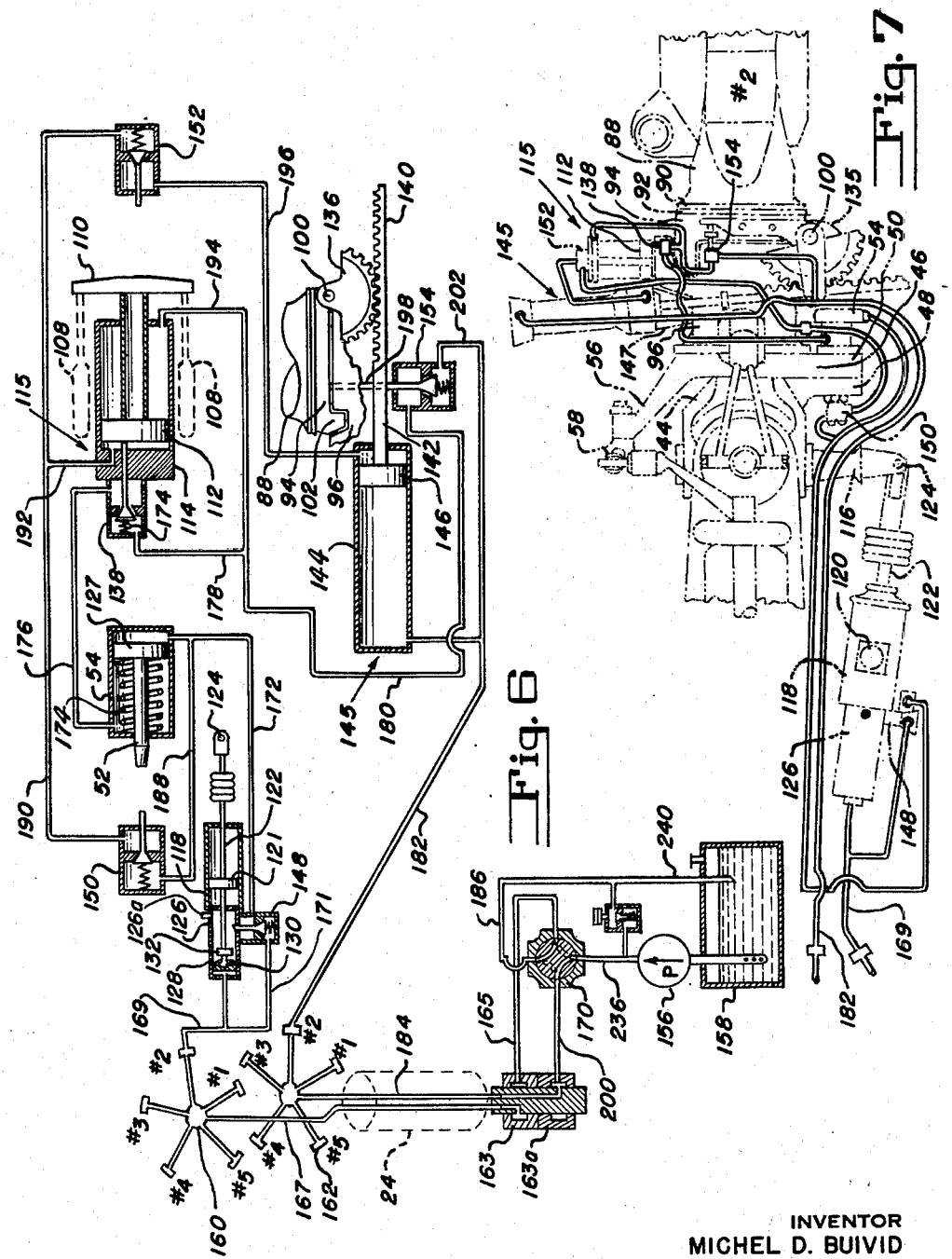

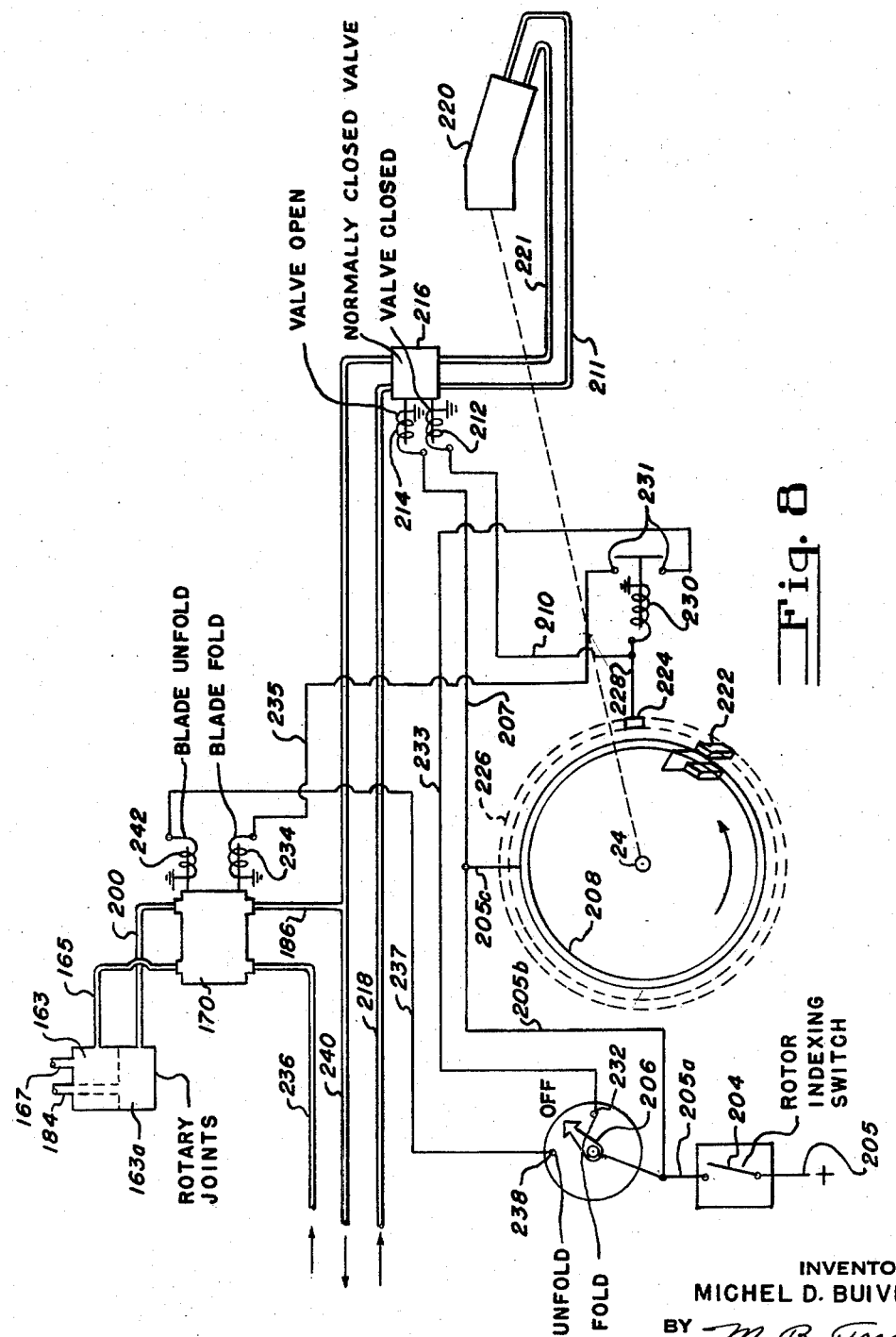

United States Patent Office

2,925,130
Patented Feb. 16, 1960

2,925,130

MEANS OF FOLDING ROTOR BLADES

Michel D. Buivid, Milford, Conn., assignor to United Aircraft Corporation, East Hartford, Conn., a corporation of Delaware Application October 1, 1954, Serial No. 459,705

33 Claims. (Cl. 170—160.12)

This invention relates to rotary wing aircraft and particularly to mechanism and methods for folding and unfolding the rotor blades of such aircraft.

When rotary wing aircraft such as helicopters are used on surface ships, for example aircraft carriers, it is necessary to fold the blades so that the helicopter can be carried below deck on elevators of standard size. This folding and unfolding of the rotor blades must usually be done while the ship is underway, frequently at full speed, and must be accomplished quickly.

One object of this invention is to provide mechanism which is automatically operative under the control of the pilot for folding and unfolding the main sustaining rotor blades of a rotary wing aircraft.

Another object of this invention is to provide improved mechanism for controlling the blade locks and their associated pitch controls in the proper sequence relative to the blade folding and unfolding operations.

A further object of this invention is to provide improved methods for folding and unfolding the blades of a multi-bladed rotor.

A still further object of this invention is generally to improve blade folding methods and foldable blade rotors for rotary wing aircraft.

These and other objects and advantages of the invention will be evident or will be pointed out in connection with the following detailed description of one embodiment of the invention shown by way of example in the accompanying drawings.

In these drawings:

Fig. 1 is a side elevation of a helicopter embodying the invention;

Fig. 2 is a side elevation of the main sustaining rotor of the helicopter of Fig. 1 with the blades broken away and parts omitted for purposes of illustration;

Fig. 3 is a simplified very diagrammatic plan view of the rotor of Fig. 2 illustrating the way a five-bladed rotor is folded in accordance with this invention, the blades being shown in the position they occupy just prior to completion of the folding cycle;

Fig. 3a is a detail elevation taken on line 3a—3a of Fig. 3, showing the inclination of the folding hinge of the No. 4 blade;

Fig. 4 is a plan view of the rotor with the hydraulic lines removed, the blades being broken away for purposes of illustration;

Fig. 5 is an enlarged detail view of the rotor in the vicinity of the attaching means for one of the blades, showing the pivot about which the blade folds and the blade pitch control means at the blade root;

Fig. 5a is a detail view on line 5a—5a of Fig. 5;

Fig. 6 is a diagrammatic view illustrating the hydraulic system;

Fig. 7 is a phantom view similar to Fig. 5 showing the conduits connected to the actuating hydraulic struts; and Fig. 8 is a diagrammatic view illustrating the primary components of the electrical and associated hydraulic circuits.

Referring to these drawings in detail, Fig. 1 shows a helicopter having a fuselage 10 including a cargo or passenger compartment 12 which extends from the nose of the ship well aft into the tail cone 14 and a forward pilots' compartment 16 above the cargo compartment. A tail rotor pylon 18 is also provided having the usual anti-torque tail rotor 20 mounted thereon for rotation about a generally horizontal axis. A main sustaining rotor 22 is mounted on an upright tubular shaft 24 which extends from the main rotor pylon 26 located just aft of the pilots' compartment. As shown herein the main rotor has five blades 27 although the number of blades used may vary in different ships.

Two engines are provided to drive the main and tail rotors, each mounted in a separate nacelle 28, one of which is shown in Fig. 1. These nacelles are carried by stub wings 30 projecting laterally from opposite sides of the fuselage, one of which is shown in dotted lines in Fig. 1. The usual main and auxiliary landing gear 32 and 34 are provided for supporting the ship on the ground which may be retracted in flight in a well-known manner.

This invention is principally concerned with the method and means for automatically folding and unfolding the main sustaining rotor blades 27. The folding mechanism provided for each blade is the same. Although one blade, the indexing blade, does not fold it is provided with the same folding mechanism for purposes of balance, these parts being utilized as carried spares. The blades rotate in counterclockwise direction as viewed from above and for purposes of description the blades are numbered counterclockwise from 1 to 5, the number one blade being the indexing blade which is positioned over the tail cone during folding and unfolding of the blades.

The main sustaining rotor 22 consists of spaced upper and lower plates 36 and 38 (Fig. 2) carried by shaft 24 and between which the blades 27 are pivotally mounted for flapping movement about generally horizontal flapping hinges 40 (Fig. 5) and for movement in the plane of blade rotation about generally vertical drag hinges 42. Plates 36 and 38 are in the shape of a spider, having five blade supporting arms. Considering one of the five blades, it will be noted that in this rotor the axes of the drag hinge and the flapping hinge of the blade intersect each other. A flapping link 44 (Fig. 2) which carries the blade is pivoted on the flapping hinge. The flapping link has a spindle 95 (Figs. 3a and 5) which extends axially of the blade and on which the root sleeve of the blade is journalled for pitch changing movement. A collar, or ring, 46 at the inboard end of the blade carries the usual blade horn, hereinafter referred to, for changing the pitch of the blade. The flapping link 44 and the collar 46 are provided with laterally projecting adjacent lugs 48 and 50, respectively, having aligned passages in which a locking pin 52 (Fig. 5) carried by lug 50 can be reciprocated to lock the blade sleeve against angular movement relative to the flapping link. A hydraulic strut including cylinder 54 carried by lug 50 controls the reciprocation of the pin 52 into and out of locking position.

Horn 56 on collar 46 (Fig. 2) is connected for universal movement at 57 to the lower end of a rod 58 the upper end of which is connected by clevis 59 to the rotatable lug extremity of an arm 60 (Fig. 4) fixed to a rocker shaft 62. Shaft 62 is journalled on one of the five blade supporting arms 64 of the spider 36 and has a second arm 68 pivotally connected at 70 to the upper end of a push-pull rod 72 (Fig. 2). The lower end of rod 72 is connected for universal movement at 74 to one lug of the rotatable portion 76 of a usual swash plate, the non-rotating portion 78 of which is prevented from rotation by a usual scissors 80. The non-rotating swash plate portion 78 has four points 84, two of which are shown in Fig. 2. The right hand point 84 as viewed in this figure is attached to the scissors 80. The other three points 84 are connected to hydraulic servos, not shown. One of these servo connection points is shown in Fig. 2. Thus to fly forward the right front point 84 is lowered and to fly backward it is raised. To fly to the left the right rear point 84 is raised and to fly to the right it is lowered. When all three servos are actuated together the swash plate is moved bodily up or down on the shaft 24 to change the pitch of all the blades collectively. The servos as usual are controlled by the pilot by mechanism, not shown.

Referring to Fig. 5, it will be noted that each blade has a fitting 88 which terminates in an inboard annular flange 90. Flange 90 is bolted to a similar flange 92 of a blade attaching member 94 forming one part of a two-part blade-folding hinge mechanism, the other part 96 of which is in the form of a sleeve, previously mentioned, journalled on the blade feathering spindle 95 (Fig. 3a) and has an annular flange 98 which is bolted to collar, or ring, 46. Hinge parts 94 and 96 are pivotally connected by a hinge pin 100 which is the pin about the axis of which the blade folds and unfolds. This hinge is best shown in Figs. 5 and 5a. Hinge part 94 has two locking lugs 102 (Figs. 3a and 4) which enter into recesses 104 in sleeve 96, the lugs 102 and the overlying portions of sleeve 96 defining the recess having aligned apertures 106 (Fig. 5) in which blade locking pins 108 are reciprocable and which in cooperation with hinge pin 100 lock the blade in its flight, or unfolded, position. Two such pins 108 are provided (Fig. 6). The pins 108 are attached to a yoke 110 which in turn is attached to the piston rod of piston 112 hydraulically reciprocable in cylinder 114 of strut 115 which is carried by sleeve 96, the piston and cylinder cooperating to withdraw and insert the pins to unlock and lock the blade folding hinge.

The flapping hinge 40 for each blade has an axial extension on which a damper attaching horizontal sleeve 116 is journalled. The damper consists of a cylinder 118 (Figs. 6 and 7) pivotally mounted at 120 in a yoke on the radial spider arm 64 of its associated blade and a piston 121 having a piston rod 122 (Fig. 6) pivotally connected at 124 to the horizontal sleeve 116, thus forming in effect a universal joint connection of the damper piston rod with the flapping hinge 40. As shown most clearly in Fig. 6, the damper cylinder 118 has an extension cylinder 126 in which a piston 128 is reciprocable. Piston 128 is carried by the end 130 of piston rod 122 and under the action of hydraulic fluid entering the cylinder at the left of the piston moves the piston rod 122 and hence swings the blade about its drag hinge until a stop 132 engages the end of cylinder 126. Any fluid which may have leaked past piston 128 or from damper cylinder 118 into the right hand end of cylinder 126 is discharged through a vent 126a. In this position of the damper parts the blade in its normal position for folding in which it is extended forward of the radial axis to full autorotative position.

The hinge part 94 has an arm 134 (Fig. 5) securely bolted thereto provided with an enlarged somewhat semi-circular end portion 135 which underlies the web of a sector gear 136 and is secured thereto by a plurality of bolts 137 arranged in a circular arc so that the angular relation of the gear 136 relative to the portion 135 may be changed. The sector gear 136 is operated by a rack 140 which forms an extension of piston rod 142 of a hydraulic strut 145 including cylinder 144 rigidly supported by bracket 147 (Fig. 5).

Hinge pin 100 additionally carries immediately beneath arm 134 an arm 135a which is fixed to sleeve 96 by a bolt (not shown). That portion of pin 100 where it passes through arm 135a is of square cross-section, as is its mating hole in 135a with the result that there is a rigid connection between pin 100 and fixed arm 135a. An arm 134a, which overlies the sector gear 136, carries at its free end bolt 135b and a roller which engages the smooth back of rack 140 and holds the rack firmly in position to mesh with sector gear 136. Bolt 135b also extends through the free end of arm 135a which is fixed to sleeve 96. Hence arms 134a and 135a and pin 100 are secured rigidly to hinge part 96, while arm 134 and gear 136 may move about pin 100 with hinge part 94. It is thus evident that hinge part 94 and the blade may be swung away from sleeve 96 in the desired blade folding motion by rack actuation of sector gear 136.

In the process of folding and unfolding the blades the operation of the drag hinge dampers for positioning the blades, the operation of the pitch control pins 52 and hinge locking pins 108 and the actual folding and unfolding operation of the blades themselves must be performed in the proper sequence. To this end sequence valves are provided in the hydraulic lines. Referring to Fig. 6, a sequence valve 148 of usual construction is provided on each damper cylinder 126 having a valve member constantly spring biased against its seat and having a valve stem which projects slightly into the cylinder 126 into position to be depressed by piston 128 to open the valve whenever the piston moves over the stem. The piston 128 has a bevelled edge on its right hand face as viewed in Fig. 6, which enables it to cam the stem of the valve 148 downwardly as it moves over the stem.

A similar sequence valve 150 is likewise associated with each hydraulic cylinder 54 in position to be engaged and opened by pin 52 at the end of its locking stroke. Similarly a sequence valve 152 is provided which is engaged and opened at the end of the unlocking stroke of pins 108. The above sequence valves are operated during the blade folding operation. A sequence valve 154 is also provided for each blade which is opened at the end of the blade unfolding stroke of the rack 140, as hinge part 94 moves against sleeve 96, all as will be more fully described in connection with the operation of the mechanism. Pins 108 also control a sequence valve 138, constantly biased toward closed position, the stem of which is engaged by piston 112 to open the valve at the end of the locking stroke of these pins.

The hydraulic system includes a pump 156 which takes fluid from a sump 158 and supplies one or the other of the distributors 160, 162 as controlled by the four-way valve 170 to fold or unfold the blades, suitable fluid transfer bearings, or rotating joints, 163 and 163a being provided in the hydraulic conduits leading to the distributors. As the mechanism for folding and unfolding the #2, #3, #4, and #5 blades is identical, except for variations in adjustment of the mechanism, that of the #2 blade only has been shown in Figs. 5, 6 and 7 for simplification. It will be understood that the blade folding movement of all the blades starts simultaneously.

Before the blades can be folded it is necessary to index the rotor until the #1 blade lies over the tail cone 14. As previously stated the #1 blade is the indexing blade and does not itself fold although it carries a full complement of folding mechanism to insure rotor balance. Referring to Fig. 8, if it is desired to fold the blades the pilot closes rotor indexing switch 204 which supplies voltage from a power source 205 through a conductor 205a to the movable switch member 206 of a pilot operable blade folding and unfolding switch. At the same time voltage is applied to conductors 205b and 205c to energize inner slip ring 208 which is carried by and rotates with the main rotor shaft 24. Simultaneously current flows through conductor 207 and a grounded valve opening solenoid 214 of a hydraulic valve 216. Operation of solenoid 214 supplies hydraulic fluid under pressure through conduit 218 through valve 216 and conduit 211 to hydraulic motor 220 which drives the rotor shaft 24 in a counterclockwise direction as indicated by the arrow in Fig. 8. Fluid from motor 220 returns through conduit 221, valve 216 and conduit 240 in a usual manner. The rotor continues to move in this direction until the jumper 222 carried by the rotor engages contact 224 when current flows from source 205 through switch 204, conductors 205a, 205b, 205c, ring 208, jumper 222 to contact 224 and thence through conductor 210 to a grounded valve closing solenoid 212 which closes hydraulic valve 216 and interrupts the flow of hydraulic fluid to motor 220.

It will be noted that when the jumper 222 engages contact 224 current will also flow from the source 205 through switch 204, conductors 205b, 205c, ring 208, jumper 222, contact 224 and conductor 228 through a grounded solenoid 230, thus bridging the contacts 231 which are in the blade folding circuit. If now the pilot moves the switch member 206 from the "Off" position shown in Fig. 8 into position to engage contact 232, current will flow from source 205 through switch 204, conductor 205a, contacts 206, 232, conductor 233, closed relay contacts 231 and conductor 235 to the grounded solenoid 234 which operates the four-way valve 170 to fold the blades as will be hereinafter fully described.

When the pilot desires to unfold the blades to bring the same again into flight position, the movable switch member 206 is moved into engagement with contact 238. Current will now flow from source 205 to switch 204, conductor 205a, contacts 206, 238, conductor 237 and grounded solenoid 242 associated with the four-way hydraulic valve 170 which directs fluid to unfold the blades. When the blades have been unfolded the rotor indexing switch 204 is opened and the movable switch member 206 is moved to the off position shown in Fig. 8. The blade folding and unfolding mechanism associated with the rotor head and controlled by the four-way hydraulic valve 170 will now be described.

Referring to Fig. 6, the blade is in its normal flight position (unfolded) as indicated by the position of the piston 128 in the extreme left end of cylinder 126 in which position the damper piston 121 is free to move through its full stroke; the piston 127 is in the right hand end of cylinder 54 in which pin 52 is withdrawn from lug 48 (Fig. 5); piston 112 is in the left end of cylinder 114 of strut 115 in which pins 108 extend through lugs 102 and lock the blade folding hinge; and the piston 146 is in the right hand end of cylinder 145 which is the extended position of rack 140.

It will be recalled that the #1 blade does not fold but remains directly over the tail cone in the position shown in Fig. 3 in which it was left when jumper 222 engaged contact 224 (Fig. 8). Blades #2 and #5 fold back 72° into the positions shown in Fig. 3 in which they lie alongside blade #1 and parallel thereto. During this folding movement blades #2 and #5 also move upward slightly due to a 3° inclination of their hinge pins 100. Also blades #3 and #4 are folded aft through 131° to bring them under blades #2 and #5 and likewise parallel with blade #1. As shown in Fig. 3 blades #3 and #4 have not completed their folding movement and it will be evident that to do so they must move under the folding hinges of blades #2 and #5. In order to accomplish this the folding hinge pins 100 of blades #3 and #4 are inclined so that these pins lie 12° from the vertical, in a direction to cause the tips of these blades to move down as they fold.

The inclination of pins 100 of the blade is possible because of the bolted connection of the flange 98 to collar 46. For example, it will be evident that by rotating sleeve 96 of blade #2 clockwise relative to collar 46, as viewed from the right hand side of Fig. 5, the folding hinge pin 100 of blade #2 will be inclined forward at the top in Fig. 3 so as to cause the tips of this blade to rise when folded aft (Fig. 3). Of course, in order to maintain the pitch relationship of the blade the same, an equal counterclockwise rotation of flange 90 relative to flange 92 is required. The dip of blades #3 and #4 upon folding is similarly provided. Thus, the hinge pin 100 of blade #4 is moved aft at the top of Fig. 3 by clockwise rotation of its flange 98 relative to collar 46 while in the case of blade #3 the pin 100 would be moved aft at the top by counterclockwise movement of flange 98 relative to its sleeve 46.

The swinging of the #2 and #5 blades through an angle of 72° and of the #3 and #4 blades through 131° is accomplished by adjusting the angle of the sector gears 136 relative to the semi-circular portion 135 of strap 134 carried rigidly by hinge part 94, as permitted by bolts 137.

As the #3 and #4 blades fold back there is a tendency for the blade root to swing upwardly about the flapping hinge which would allow the blade assembly to drop at its outer portion. This is prevented by the anti-coning lock 77 which engages an abutment 77' on sleeve 96 (Fig. 2).

With the rotor indexed into the proper position for blade folding, movement of switch member 206 (Fig. 8) into contact with terminal 232, supplies current to solenoid 234 as previously described. Actuation of solenoid 234 permits hydraulic fluid to flow from tank 158 through pump 156, conduit 236, valve 170, conduit 165, rotary valve 163, conduit 167 (Fig. 6), distributor 160 and conduit 169 to the left hand end of cylinder 126. Fluid acting on piston 128 moves the latter to the right until the stop 132 engages the right hand end of cylinder 126. In this position of piston 128, the stem of normally closed valve 148 lies directly beneath the piston and the valve is held open by it so that fluid is now free to flow through conduit 171, valve 148 and conduit 172 to the right hand end of cylinder 54. Fluid acting on piston 127 moves pin 52 to the left against the action of spring 174. During this movement of piston 127 the fluid in cylinder 54 flows through conduit 176, open valve 138, conduits 178 and 180, open valve 154 and conduits 202 and 182 to distributor 162 and thence through conduit 184, rotating joint 163a, conduit 200, valve 170 and conduits 186 and 240 to the sump 158.

As pin 52 moves into lug 48 (Fig. 5) to lock collar 46 to the flapping link 44 it engages the stem of normally closed valve 150 to open the latter and allow fluid to flow from conduit 188, through valve 150, conduits 190 and 192 to cylinder 114, moving piston 112 to the right. The fluid in cylinder 114 flows through conduit 194 into conduit 180 and thence to sump 158 as previously described. As the fluid moves piston 112 to the right, it withdraws pins 108 from lugs 102 of the locking hinge part 94 which leaves the blade free to swing about its hinge pin 100. In the final movement of piston 112 yoke 110 engages the stem of normally closed valve 152 and opens it to admit fluid through conduit 196 to cylinder 144 of the blade actuating strut 145. The fluid in cylinder 144 is free to return through the conduit 182 to sump 158 as the fluid entering through conduit 196 moves the piston 146 to the left to effect folding movement of the blade about its hinge pin 100 through the action of the rack 140 and sector gear 136.

It will be noted that as the blade folds and the root portion 88 of the blade swings about pivot pin 100, the hinge part 94, which in the unfolded position of the blade engages valve stem 198 and holds it open, is removed and under the action of its spring this valve closes. Also, it will be noted that when piston 112 moves to the right, valve 138 also closes under the action of its spring 174.

To move the blades into flight position (unfold) the pilot moves switch member 206 (Fig. 8) to engage contact 238 and a circuit is thereby closed to solenoid 242 of selector valve 170. As a result this valve 170 moves into the solid line position shown in Fig. 6 so that fluid under pressure from pump 156 will flow through conduit 236, valve 170, conduit 200, rotating joint 163a, conduit 184, distributor 162, and conduit 182 to cylinder 144 to move piston 146 to the right and swing the blade back to normal flight position. As the hinge part 94 moves into engagement with the sleeve 96 it engages the stem 198 of valve 154 and opens the latter to admit fluid through conduit 202, valve 154 and conduits 180 and 194 to cylinder 114. The resulting movement of piston 112 to the left in Fig. 6 causes the locking pins 108 to pass through lugs 102 and enter sleeve 96 to again lock the blade against movement about its hinge pin 100. As piston 112 moves to the left it also withdraws the crossbar 110 allowing valve 152 to close. Also as piston 112 reaches the end of its stroke it opens valve 138 which admits fluid from conduit 178 to conduit 176 and cylinder 54. Fluid admitted to cylinder 54 moves piston 127 to the right in Fig. 6 allowing valve 150 to close and unlocking the pitch control ring 46. This returns the parts to their original position at the beginning of the folding and unfolding cycle.

It will be evident that as a result of this invention it is possible to automatically fold and unfold the blades of a multi-blade rotor by controls in the pilot's compartment. It will also be evident that the pitch changing mechanism of the blades is safeguarded during folding and unfolding of the blades and that the mechanism is such that the various operations are carried out in sequence so that failure of any of the mechanism will immediately become known to the pilot.

It will also be evident that means have been provided for compactly folding the blades of a five-bladed rotor into positions in which all the blades extend aft over the tail cone.

I claim:

1. In combination, in a rotary wing aircraft a rotor having a plurality of blades pivotally mounted for movement about a drag hinge and about their longitudinal axes for blade pitch change, blade pitch controlling mechanism operatively connected to said blades, hinge means for each of said blades permitting blade folding about an axis, a hydraulic drag hinge damper operatively connected to each blade controlling the movement of each blade in the plane of blade rotation, power operated means operatively connected to said blades for locking and unlocking said blade folding hinge means, power operated means operatively connected to said blades for folding said blades, means operatively connected to said dampers for admitting fluid to said dampers to position said blades for folding movement, means operatively connected to pitch controlling mechanism automatically operative as a result of the movement of said blades by said dampers for locking said pitch controlling mechanism, means operatively connected to said blades automatically operative as a result of the locking of said pitch controlling mechanism for unlocking said hinge means, and means operatively connected to said blade folding means automatically operative upon unlocking of said hinge means for operating said blade folding means.

2. In combination, in a rotary wing aircraft, a rotor having a plurality of blades pivoted for movement about drag hinges and each having hinge means about which the blades are adapted to be folded, means operatively connected to said blades for locking said hinge means with said blades in flight position, hydraulic dampers operatively connected to said blades controlling the movement of said blades about their drag hinges, hydraulically operated means operatively connected to said blades for unlocking said hinge means, hydraulically operated means operatively connected to said blades for folding said blades, pilot operative means operatively connected to said dampers for supplying fluid to said dampers to position said blades about their drag hinges for folding movement, and sequence valve means operatively connected between said dampers and said hinge unlocking means and also operatively connected between said unlocking means and said blade folding means, whereby operation of said pilot operative means to supply fluid to said dampers results in the automatic positioning of the blades for folding, the unlocking of said blade hinge means and the folding of said blades.

3. In a rotary wing aircraft, a rotor having a plurality of blades pivoted for movement about drag hinges and each having blade folding hinge means, hydraulic dampers operatively connected to said blades controlling the movement of said blades about their drag hinges, hydraulically operated means operatively connected to said blades for locking said hinge means, hydraulically operated means operatively connected to said blades for folding said blades, pilot operative means operatively connected to said hydraulically operated means for directing hydraulic fluid to fold said blades, means operatively connected to said pilot operative means responsive to the operation of said pilot operative means to fold said blades for admitting fluid to said dampers to move said blades to predetermined positions, means operatively connected to said blades automatically operative as a result of the positioning of the blades for admitting fluid to said hinge locking means to unlock said blades for folding, and means operatively connected to said blade folding means automatically responsive to the unlocking operation of said blade locking means for directing fluid to said blade folding means to fold said blades.

4. In a helicopter, a rotor having a plurality of blades, each provided with a hinge about which the blades can be folded, locking means operatively connected to said blades for said hinges movable between a hinge locking position in which the blades are locked in flight position and an unlocked position in which said blades are free to fold, means operatively connected to said blades for actuating said blades between folded position and flight position, means operatively connected to said blades operable as a result of the unlocking operation of said hinge locking means for actuating said blades into folded position, and means operatively connected to said hinge locking means operable as a result of the movement of said blades into flight position by said actuating means for moving said hinge locking means into blade locking position.

5. In a helicopter, a rotor, a plurality of blades pivotally mounted on said rotor by drag hinges and each provided with a blade folding hinge, means operatively connected to said blades for varying the pitch of said blades including pilot operable pitch control mechanism, means operatively connected to said blades for locking said blade folding hinges with the blades in flight position, means operatively connected to said blades for actuating said blades about their folding hinges, hydraulic dampers operatively connected to said blades controlling the movement of said blades about said drag hinges, means operatively connected to said dampers for admitting hydraulic fluid to said dampers to position said blades for folding, means operatively connected to said pitch control mechanism responsive to positioning of said blades by said dampers for locking said pitch control mechanism, means operatively connected to said hinge locking means responsive to said last mentioned means for unlocking said hinge locking means, and means operatively connected to said blades responsive to the unlocking operation of said hinge locking means for folding said blades.

6. In a helicopter, a rotor, a plurality of blades pivotally mounted on said rotor by drag hinges, a blade folding hinge for each of said blades, means operatively connected to said blades for varying the pitch of said blades including pilot operable pitch control mechanism, power operated locking and unlocking means operatively connected to said blades for said blade folding hinges, power operated means operatively connected to said blades for actuating said blades about said folding hinges, hydraulic dampers operatively connected to said blades controlling the movements of said blades about said drag hinges, means operatively connected to said dampers for admitting hydraulic fluid to said dampers to position said blades for folding, means operatively connected to said pitch control mechanism automatically responsive to the blade positioning movement of said dampers for locking said pitch control mechanism, means operatively connected to said hinge unlocking means responsive to the operation of said last mentioned means for operating said hinge unlocking means, and means operatively conencted to said blade folding means automatically responsive to the unlocking operation of said hinge locking means for actuating said blade folding means.

7. In a helicopter, a rotor, a plurality of blades pivotally mounted on said rotor by drag hinges, a blade folding hinge for each of said blades, means operatively connected to said blades for varying the pitch of said blades including pilot operable pitch control mechanism, hydraulically operated locking and unlocking means operatively connected to said blades for said blade folding hinges, hydraulically operated means operatively connected to said blades for actuating said blades about said folding hinges, hydraulic dampers operatively connected to said blades controlling the movements of said blades about said drag hinges, pilot operative means operatively connected to said dampers for admitting hydraulic fluid to said dampers to position said blades for folding, means operatively connected to said pitch control mechanism automatically responsive to the blade positioning movement of said dampers for locking said pitch control mechanism, means operatively connected to hinge unlocking means responsive to the operation of said last-mentioned means for operating said hinge unlocking means, means operatively connected to said blade folding means automatically responsive to the operation of said hinge unlocking means for actuating said blade folding means, said pilot operative means also being movable to admit hydraulic fluid to said actuating means for reversely moving the same to unfold said blades, means operatively connected to said hinge locking means automatically responsive to the blade unfolding movement of said actuating means for operating said hinge locking means, and means operatively connected to said blade pitch control mechanism automatically responsive to the locking movement of said hinge locking means for automatically unlocking said blade pitch control mechanism, whereby said rotor is again in flight condition.

8. In a helicopter, a rotor having a plurality of variable pitch blades mounted on drag hinges for movement in the plane of blade rotation, means operatively connected to said blades for controlling the pitch of said blades, hydraulic dampers operatively connected to said blades for controlling the lag-lead movements of said blades, a blade folding hinge for each blade, hydraulically operated means operatively connected to said blades for locking said hinges with the blades in flight position, hydraulically operated means operatively connected to said blades for actuating said blades about their folding hinges, pilot operative means operatively connected to said blades for indexing said rotor to bring one of said blades into an aft extended position, means operatively connected to said dampers for supplying hydraulic fluid to said dampers for positioning said blades for folding, sequence valve means operatively connected to said pitch control means for supplying hydraulic fluid to said pitch control means to lock the same in response to positioning of said blades, second sequence valve means operatively connected to said hinge locking means for supplying fluid to said hinge locking means operable upon locking of said pitch control means to unlock said blade hinges, and third sequence valve means operatively connected to said actuating means operable upon unlocking of said hinges for supplying fluid to said actuating means to fold said blades.

9. In a helicopter, a rotor having at least five blades all attached to the rotor in the same horizontal plane, means operatively connected to said rotor for indexing the rotor and positioning said blades whereby one of the blades lies aft in the longitudinal centerline of the ship, means operatively connected to said blades adjacent each side of said blade extending aft for folding said two remaining blades which are on opposite sides of said centerline into vertical planes parallel with the vertical planes occupied by said one blade, and means operatively connected to another pair of blades for folding said pair of blades which are on opposite sides of said centerline into positions in which they lie beneath and substantially in the vertical planes occupied by said other two remaining blades.

10. In a helicopter, a rotor having five blades all attached to the rotor in the same horizontal plane at equally spaced points about the rotor axis, means operatively connected to said blades for positioning said blades whereby one blade lies aft in the longitudinal centerline of the helicopter with a first pair of blades extending aft and a second pair extended forward, means operatively connected to said first pair of blades for folding the first pair of blades further aft into vertical planes in parallel relation with the vertical planes occupied by said one blade, and means operatively connected to said second pair of blades for folding said second pair of blades aft substantially into the vertical planes occupied by said first pair.

11. In a helicopter, a rotor having five blades spaced equally apart about the rotor axis, means operatively connected to said blades for positioning said blades whereby one blade is positioned aft in the longitudinal centerline of the helicopter with a first pair of blades extended aft and a second pair of blades extended forward, means operatively connected to said first pair of blades for folding said first pair of blades further aft into vertical planes generally parallel with the vertical planes occupied by said one blade including means for inclining said blades upwardly at their tips during such folding operation, and means operatively connected to said second pair of blades for folding said second pair of blades aft into the vertical planes occupied by said first pair of blades including means for inclining said blades downwardly their tips whereby said second pair of blades when folded lie beneath said first pair.

12. In a helicopter, a 5-bladed rotor, means operatively connected to said blades for positioning the blades for folding whereby one blade is extended aft ship, means operatively connected to two of said remaining blades for folding said two remaining blades aft into vertical planes parallel to the vertical plane occupied by said one blade including means operatively connected to said blades for raising the blades at their outer ends during such folding movement, and means operatively connected to the two remaining blades for folding the two remaining blades aft into vertical planes parallel to the vertical plane occupied by said one blade including means operatively connected to said blades for lowering the blades at their outer ends during folding, whereby said second pair of blades can fold beneath said first pair.

13. In a helicopter, a rotor, a blade mounted on said rotor by a flapping hinge, a flapping link outboard of said hinge, a blade pitch control ring journalled on said link, a two-part blade folding hinge, one part comprising a sleeve journalled on said flapping link and having an inboard flange abutting said ring, the other part having an outboard flange, said hinge parts being connected by an upstanding hinge pin, a root fitting on said blade having a flange abutting said outboard flange on said other hinge part, said abutting flanges and said abutting ring and flange having means for connecting them in a plurality of angular positions of adjustment about the longitudinal axis of said blade, whereby said hinge pin can be inclined by angular adjustment of said sleeve relative to said ring and the pitch of the blade can be corrected by an equal and opposite angular adjustment of said root fitting relative to said blade folding hinge.

14. In a helicopter, a rotor hub, a blade supporting spindle on said hub, a sleeve journalled on said spindle forming one part of a blade folding hinge, a blade pitch control ring having a horn, means securing said ring to said sleeve in one of a plurality of angular positions of adjustment of the latter relative to said spindle, a blade attachment member pivotally mounted on said sleeve by an upstanding hinge pin and forming the other part of said blade folding hinge, means operatively connected to said hinge parts for locking said hinge parts against folding, a blade having a root fitting, and means securing said fitting to said blade attachment member in one of a plurality of angular positions of adjustment relative to said spindle axis.

15. In a helicopter, a rotor hub, a flapping link pivotally mounted on said hub by a flapping hinge and having a blade supporting spindle, a sleeve journalled on said spindle forming one part of a blade folding hinge, a blade pitch control ring, means securing said ring to said sleeve in one of a plurality of angular positions of adjustment of the latter relative to said spindle, a blade attachment member pivotally mounted on said sleeve by an upstanding hinge pin and forming the other part of said folding hinge, means operatively connected to said hinge parts for locking said hinge parts against folding, a blade having a root fitting, and means securing said fitting to said blade attachment member in one of a plurality of angular positions of adjustment relative to said spindle axis.

16. In a helicopter, a rotor hub, a flapping link pivotally mounted on said hub by a flapping hinge and having a blade support spindle, a sleeve journalled on said spindle forming one part of a blade folding hinge, a blade pitch control ring, means securing said ring to said sleeve in one of a plurality of angular positions of adjustment of the latter relative to said spindle, means operatively connected to said ring for locking said ring rigidly to said flapping link in one position of angular adjustment of said ring, a blade attachment member pivotally mounted on said sleeve by an upstanding hinge pin and forming the other part of said blade folding hinge, means operatively connected to said hinge parts for locking said hinge parts against folding, a blade having a root fitting, and means securing said fitting to said blade attachment member in one of a plurality of angular positions of adjustment relative to said spindle axis.

17. In a helicopter, a rotor hub, a flapping link pivotally mounted on said hub by a flapping hinge and having a blade supporting spindle, a sleeve journalled on said spindle comprising one part of a two-part blade folding hinge, a blade attachment member forming the other part of said hinge, a hinge pin connecting said hinge parts, means operatively connected to said hinge for locking said hinge against folding movement about said hinge pin, a blade secured to said attachment member having a root fitting, blade pitch control means including a ring member adjacent said sleeve having a horn, and means operatively connected to said hinge pin for inclining said hinge pin while maintaining the pitch of the blade unchanged including means for securing said sleeve to said ring member and said blade root fitting to said attachment member in one of a plurality of positions of angular adjustment.

18. In a helicopter, a rotor hub, a flapping link pivotally mounted on said hub for movement about a horizontal flapping hinge, said flapping link having an outwardly directed spindle, a sleeve journalled on said spindle, pitch changing means carried by said sleeve including a ring member having a pitch control horn eccentric of said spindle, blade folding hinge means on the outboard end of said sleeve including a blade attaching member pivoted to said sleeve member for movement about an upstanding hinge pin, means operatively connected to said attaching member for locking said attaching member to said sleeve against movement about said pin, pilot operative means operatively connected to said locking means for releasing said locking means, and means operatively connected to said blade operative when said locking means is released for automatically folding said blade.

19. In a helicopter, rotor hub having a blade, a blade folding hinge between said blade and said hub, means operatively connected to said hinge for locking and unlocking said hinge including a hydraulic strut, means operatively connected to said blade for folding and unfolding said blade including a second hydraulic strut, a pinion carried by the root of said blade, a rack carried by said second mentioned strut and meshing with said pinion, pilot operative means operatively connected to said first mentioned strut for supplying fluid to said first mentioned strut for unlocking said hinge, and means operatively connected to said second mentioned strut responsive to the unlocking movement of said hinge locking means for supplying fluid to said second mentioned strut for actuating said rack to fold said blade.

20. In combination in a rotary wing aircraft, a rotor having a plurality of blades pivotally mounted for movement about a drag hinge and about their longitudinal axes for blade pitch change, blade pitch controlling mechanism operatively connected to the aircraft, each blade having hinge means for each of said blades permitting blade folding about an axis between a folded and a flight position, hydraulic drag hinge damper means operatively connected between said blades and said rotor controlling the movement of blades in the plane of blade rotation, means operatively connected to said blades for locking said hinge means with the blades in flight position, means operatively connected to said damper means for admitting fluid to said drag hinge damper means to position said blades about their drag hinges for folding movement, means operatively connected to said pitch controlling mechanism operable as a result of the movement of said blades by said damper for locking said pitch controlling mechanism, means operatively connected to said blades operable as a result of the locking of said pitch controlling mechanism for unlocking said blade folding hinge means, and means operatively connected to said blades operable as a result of the unlocking of said hinge means for folding said blades.

21. In a helicopter, a rotor having a plurality of variable pitch blades, each blade having hinge means about which the blade can be folded, means operatively connected to said blades for locking said hinge means with the blades in flight position, means operatively connected to at least some of said blades for actuating said blades between folded and flight positions, means operatively connected to said rotor for indexing said rotor to bring a selected blade into a predetermined position, means operatively connected to said blades having blade actuating means connected thereto for unlocking said hinge means, and means operatively connected to said blades having blade actuating means connected thereto operable as a result of the unlocking of said hinge means for actuating said blades into folded position.

22. In combination in a rotary wing aircraft, a rotor, said rotor having a plurality of blades for folding, said folding blades having hinge means connected to said rotor about the axis of which the blades fold between a flight position and a folded position, means operatively connected to said rotor for locking said blades in flight position, means operatively connected to said blades for positioning said blades for folding movement, means operatively connected to said locking means operable as a result of the positioning operation of said positioning means for unlocking said blades, and means operatively connected to said blades operable as a result of the unlocking operation of said blade locking means for folding said blades.

23. In combination in a rotary wing aircraft, a rotor, said rotor having a plurality of blades for folding, said folding blades having hinge means connected to said rotor about the axis of which the blades fold between a flight position and a folded position, means operatively connected to said rotor for locking said blades against folding movement, means operatively connected to said blades for positioning said blades for folding movement, means operatively connected to said locking means for unlocking said blades, means operatively connected to said blades for folding said blades, and means operatively connected to said unlocking means and said positioning means for preventing operation of said unlocking means except when said positioning means has positioned said blades for folding.

24. In combination in a rotary wing aircraft, a rotor, said rotor having a plurality of blades for folding, said folding blades having hinge means connected to said rotor about the axis of which the blades fold between a flight position and a folded position, means operatively connected to said rotor for locking said blades against folding movement, means operatively connected to said blades for positioning said blades for folding movement, means operatively connected to said locking means for unlocking said blades, means operatively connected to said blades for folding said blades, means operatively connected to said unlocking means and said positioning means for preventing operation of said unlocking means except when said positioning means has positioned said blades for folding, and means operatively connected to said blade folding means and said unlocking means for preventing operation of said blade folding means except when said unlocking means has unlocked said blades.

25. In combination in a rotary wing aircraft, a rotor, a plurality of blades for folding, hinge means operatively connected to said blades connecting them to said rotor for movement between flight position and a folded position, means operatively connected to said blades for locking said blades in flight position, means operatively connected to said blades for positioning said blades for folding movement, means operatively connected to said locking means for unlocking said blades, and means operatively connected to said blades for folding said blades, said means for unlocking said blades being responsive to the means for positioning said blades when said blades have been positioned for folding.

26. In combination in a rotary wing aircraft, a rotor, a plurality of blades for folding, hinge means operatively connected to said blades connecting them to said rotor for movement between flight position and a folded position, means operatively connected to said blades for locking said blades in flight position, means operatively connected to said blades for positioning said blades for folding movement, means operatively connected to said locking means for unlocking said blades, and means operatively connected to said blades for folding said blades, said means for unlocking said blades being responsive to the means for positioning said blades when said blades have been positioned for folding, said means for folding said blades being responsive to the unlocking operation of said locking means.

27. In combination in a rotary wing aircraft, a rotor, a plurality of blades for folding, hinge means for each of said blades connecting it to said rotor for movement between flight position and a folded position, means operatively connected to each blade for locking said blade against folding movement, means operatively connected to each blade for positioning said blade for folding movement, means operatively connected to each locking means for unlocking each blade, and means operatively connected to each blade for folding said blade, each means for unlocking each blade being responsive to the means for positioning said blade when said blade has been positioned for folding, each means for folding a blade being responsive to the unlocking operation of the unlocking means associated with said blade.

28. In a rotary wing aircraft, a rotor, a pluality of blades for folding, means operatively connected to each blade connecting it to said rotor for pitch changing movement, each folding blade having hinge means about the axis of which the blade folds between a flight position and a folded position, first means operatively connected between said blades and rotor for locking said blades against pitch changing movement, second means operatively connected to said blades locking said blades in flight position, means operatively connected to said blades for positioning said blades for folding movement, means operatively connected to said blades for unlocking said second locking means so that said blades will be able to fold between a flight position and a folded position, and means operatively connected to said blades for folding said blades.

29. In a rotary wing aircraft, a rotor, a plurality of blades for folding, means operatively connected to each blade connecting it to said rotor for pitch changing movement, each folding blade having hinge means about the axis of which the blade folds between a flight position and a folded position, first means operatively connected between said blades and rotor for locking said blades against pitch changing movement, second means operatively connected to said blades locking said blades in flight position, means operatively connected to said blades for positioning said blades for folding movement, means operatively connected to said blades for unlocking said second locking means so that said blades will be able to fold between a flight position and a folded position, and means operatively connected to said blades for folding said blades, said first means for locking said blades against pitch changing movement being responsive to the means for positioning said blades.

30. In a rotary wing aircraft, a rotor, a plurality of blades for folding, means operatively connected to each blade connecting it to said rotor for pitch changing movement, each folding blade having hinge means about the axis of which the blade folds between a flight position and a folded position, first means operatively connected between said blades and rotor for locking said blades against pitch changing movement, second means operatively connected to said blades locking said blades in flight position, means operatively connected to said blades for positioning said blades for folding movement, means operatively connected to said blades for unlocking said second locking means so that said blades will be able to fold between a flight position and a folded position, and means operatively connected to said blades for folding said blades, said first means for locking said blades against pitch changing movement being responsive to the means for positioning said blades, said means for unlocking said blades being responsive to the first locking means.

31. In a rotary wing aircraft, a rotor, a plurality of blades for folding, means operatively connected to each blade connecting it to said rotor for pitch changing movement, each folding blade having hinge means about the axis of which the blade folds between a flight position and a folded position, first means operatively connected between said blades and rotor for locking said blades against pitch changing movement, second means operatively connected to said blades locking said blades in flight position, means operatively connected to said blades for positioning said blades for folding movement, means operatively connected to said blades for unlocking said second locking means so that said blades will be able to fold between a flight position and a folded position, and means operatively connected to said blades for folding said blades, said first means for locking said blades against pitch changing movement being responsive to the means for positioning said blades, said means for unlocking said blades being responsive to the first locking means, said means for folding said blades being responsive to said unlocking means.

32. In combination in a rotary wing aircraft, a rotor, said rotor having a plurality of blades for folding, said folding blades having hinge means connected to said rotor about the axis of which the blades fold between a flight position and a folded position, means operatively connected to said rotor for locking said blades in flight position, said blades having a predetermined position from which they are folded, means operatively connected to said locking means operable as a result of the blades being in said predetermined position for unlocking said blades, and means operatively connected to said blades operable as a result of the unlocking operation of said blade locking means for folding said blades.

33. In a helicopter, a rotor having five blades all attached to the rotor in the same horizontal plane at symmetrically arranged points about the rotor axis, means operatively connected to said blades for positioning said blades whereby one blade lies aft in the longitudinal centerline of the helicopter, means operatively connected to the remaining pair of aft extended blades for folding said aft extended blades further aft into vertical planes generally parallel to the vertical plane occupied by said one blade, and means operatively connected to the pair of forward extended blades for folding said forward extended blades aft into vertical planes generally parallel to the vertical plane occupied by said one blade.

References Cited in the file of this patent

UNITED STATES PATENTS

| | | |
|---|---|---|
| 2,068,774 | Smith | Jan. 26, 1937 |
| 2,385,464 | Peterson | Sept. 25, 1945 |